(No Model.)

A. W. ADAMS.
CAN VENTILATOR.

No. 451,198. Patented Apr. 28, 1891.

WITNESSES:
Chas. Nida
C. M. Clark

INVENTOR:
A. W. Adams
BY
Munn & Co
ATTORNEYS

UNITED STATES PATENT OFFICE.

ALBERT W. ADAMS, OF PITTSBURG, PENNSYLVANIA.

CAN-VENTILATOR.

SPECIFICATION forming part of Letters Patent No. 451,198, dated April 28, 1891.

Application filed July 30, 1890. Serial No. 360,335. (No model.)

*To all whom it may concern:*

Be it known that I, ALBERT W. ADAMS, of Pittsburg, in the county of Allegheny and State of Pennsylvania, have invented a new and Improved Can-Ventilator, of which the following is a full, clear, and exact description.

My invention relates to improvements in ventilators for milk-cans. It is well known that when new milk is placed in milk-cans for shipment and the cans are closed tightly the animal matter cannot escape, and consequently the milk quickly sours.

The object of my invention is to obviate this difficulty by ventilating the can in such a manner that the animal matter may escape and fresh air circulate freely through the can, and at the same time to provide means for preventing the milk from being lost by splashing through the ventilator.

The invention consists in the particular construction and arrangement of parts, as hereinafter fully described, and pointed out in the claim.

Reference is to be had to the accompanying drawings, forming a part of this specification, in which similar letters of reference indicate corresponding parts in all the figures.

Figure 1:
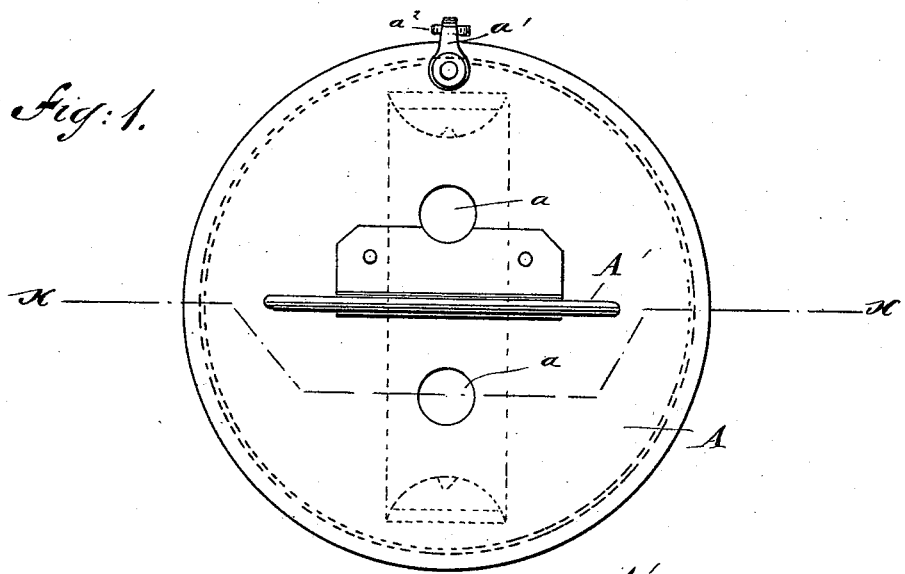
Figure 2:
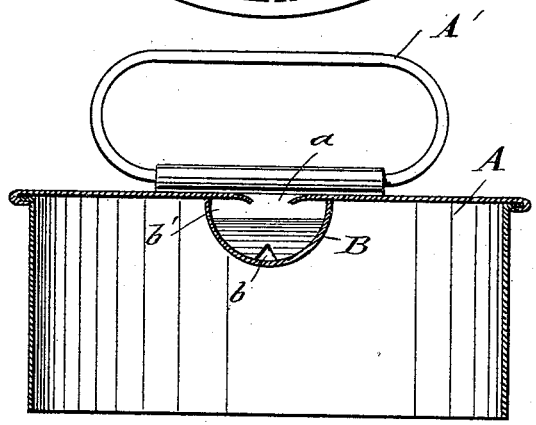
Figure 3:
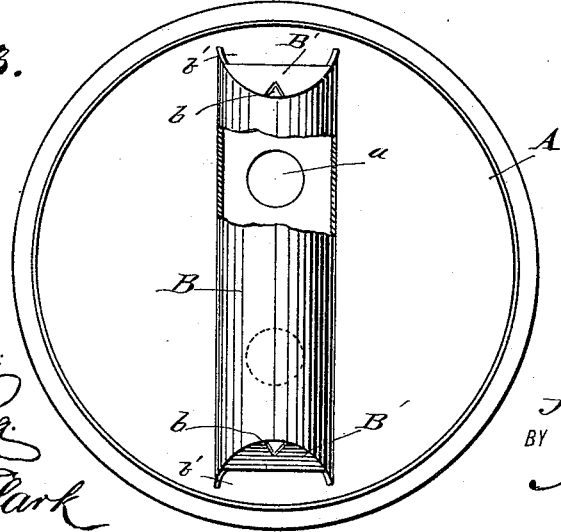

Figure 1 is a plan view of a can top or cover ventilated in accordance with my invention. Fig. 2 is a vertical transverse section of the same on the line $xx$ of Fig. 1, and Fig. 3 is a broken inverted plan of the same.

In the accompanying drawings, A is an ordinary can top or cover, which is attached to a can in the usual manner, and is provided with a handle A', of the usual construction, by means of which it may be easily placed in the can-nozzle or removed. The can-top A has perforations $a$ through it, there being two shown in the drawings; but any desired number may be used. The can is also provided with a lug $a'$, extending from one side, to which a chain $a^2$ is attached in the usual manner to prevent the can-top from being lost.

On the under side of the can-top, and directly beneath the perforations $a$, is a half-round shield B, although the shape is not material, which is fastened to the can-top, and the ends B' of which are beveled and partly closed, as shown, there being a perforation $b$ in each end in the closed portion thereof and above the said perforation and next the can-top an opening $b'$. The shield B is preferably of a length a little less than the diameter of the top, so that it will extend nearly across the said top, so as to more effectually prevent the milk from splashing out, and the perforations $a$ of the top are preferably arranged on opposite sides of the handle, so that they will be some distance apart, and thereby better ventilate the can. It will thus be seen that when the can-top is in position in the can the animal matter from the milk passes out through one perforation $a$ of the top and the perforations $b\ b'$ in one end of the shield, and the fresh air enters freely through the other perforation $a$ of the top and the perforations $b\ b'$ in the other end of the shield, so that the can is thoroughly ventilated, and consequently the milk may be kept a long time without souring. It will also be understood that as the perforations in the shield and the perforations in the can-top do not align the milk cannot be splashed through the can-top.

I do not limit myself to the particular shape of the shield shown in the drawings, nor to the exact location of the perforations in the shield, nor to the kind of perforations used.

Having thus fully described my invention, I claim as new and desire to secure by Letters Patent—

As an improved article of manufacture, a can-top having the two spaced apertures $a\ a$ and provided on its under surface beneath the apertures with the shield B, having beveled ends and openings $b\ b'$ in said ends, the said shield being of a length a little less than the diameter of the top, as specified.

ALBERT W. ADAMS.

Witnesses:
FRANK M. MCKELVEY,
J. B. ANDERSON.